(12) United States Patent
Bago et al.

(10) Patent No.: US 11,332,351 B2
(45) Date of Patent: May 17, 2022

(54) JACK PAD DEVICE AND METHOD FOR JACKING AN AIRCRAFT

(71) Applicant: Gulfstream Aerospace Corporation, Savannah, GA (US)

(72) Inventors: Timothy Bago, Savannah, GA (US); James Perdue, Savannah, GA (US); Patrick Leonard, Savannah, GA (US); Jason Jones, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 178 days.

(21) Appl. No.: 16/667,768

(22) Filed: Oct. 29, 2019

(65) Prior Publication Data
US 2021/0122618 A1 Apr. 29, 2021

(51) Int. Cl.
*B66F 3/36* (2006.01)
*B64F 5/50* (2017.01)

(52) U.S. Cl.
CPC ............... *B66F 3/36* (2013.01); *B64F 5/50* (2017.01); *B66F 2700/123* (2013.01)

(58) Field of Classification Search
CPC ...... B66F 3/36; B66F 3/24; B66F 3/00; B66F 1/00; B66F 5/00; B66F 7/00; B66F 7/08; B66F 7/10; B66F 7/26; B66F 7/28; B66F 2700/123; B64F 5/50; B64F 1/22
USPC ......... 254/133 R, 96 R, 3 B, 8 R, 9 B, 89 H, 254/10 R
See application file for complete search history.

(56) References Cited

U.S. PATENT DOCUMENTS

| | | | | |
|---|---|---|---|---|
| 1,896,715 | A * | 2/1933 | Martinetti ................. | B66F 3/16 254/1 |
| 2,838,278 | A * | 6/1958 | Tarbet ...................... | B66F 5/04 254/134 |
| 6,089,545 | A * | 7/2000 | Norman ................... | B66F 5/04 254/131 |
| 6,257,552 | B1 * | 7/2001 | Crow ....................... | B66F 3/24 254/134 |
| 6,457,700 | B1 * | 10/2002 | Hong ...................... | B66C 23/48 254/124 |
| 2019/0185087 | A1 * | 6/2019 | Moraes ..................... | B66F 3/36 |
| 2020/0148521 | A1 | 5/2020 | Leonard et al. | |

FOREIGN PATENT DOCUMENTS

| CN | 205838506 U | 12/2016 |
|---|---|---|
| EP | 0287044 A1 | 10/1988 |

* cited by examiner

*Primary Examiner* — Lee D Wilson
*Assistant Examiner* — Robert F Neibaur
(74) *Attorney, Agent, or Firm* — LKGlobal | Lorenz & Kopf, LLP

(57) ABSTRACT

A jack pad device adapted to transfer loads between an aircraft and a jack device for jacking the aircraft, and a method for jacking an aircraft are provided. In one non-limiting example, the jack pad device includes a jack pad body. A jack engagement portion extends from the jack pad body and is configured to engage the jack device. A first coupler is attached to the jack pad body and is configured to couple to the aircraft to hold the jack pad device to the aircraft.

16 Claims, 6 Drawing Sheets

JACK PAD DEVICE AND METHOD FOR JACKING AN AIRCRAFT

TECHNICAL FIELD

The technical field relates generally to the jacking up of an aircraft, and more particularly, relates to jack pad devices adapted to transfer loads between an aircraft and a jack device for jacking the aircraft, and methods for jacking an aircraft.

BACKGROUND

In the aircraft industry, many components require inspection and/or service maintenance during the life of an aircraft. Often, the aircraft needs to be lifted or otherwise jacked up above the ground for performing such tasks. Jack devices, such as, for example, tripod jacks or the like, are typically employed for lifting, hoisting or otherwise jacking up the aircraft. Multiple jack devices are positioned underneath various sections of the aircraft and are actuated to raise and/or lower the aircraft.

To ensure that the vertical forces produced by the jack devices are effectively translated to the various intended locations of the aircraft for lifting and/or lowering the aircraft, jack pads that are configured to interface with the jack devices are temporarily placed against the aircraft at the various locations. The jack devices directly engage the jack pads without contacting the aircraft to prevent damage to the aircraft, while the jack pads function to transfer loads between the jack devices and the aircraft for vertical movement of the aircraft.

Many jack pads include vertical alignment pins and are manually positioned at an intended location against the aircraft with the vertical alignment pins being received within locator holes that are provided in the fuselage or skin structure of the aircraft. Each jack pad is then manually held in place against the aircraft by one technician so that the vertical alignment pins remain in the locator holes until another technician actuates the jack device to move the jack device's ram into contact with the jack pad to support the jack pad against the aircraft. This is inefficient, requiring multiple technicians to position and support a single jack pad at an intended location against the aircraft.

In addition, when the aircraft is jacked up or is being jacked up, for various reasons, a certain section of the aircraft (e.g., nose section) may get light or may slightly lift (e.g., ¼ to ½ an inch of unintended vertical displacement). This can cause the vertical alignment pins of the jack pad to come out of the locator holes. At the same time, the jack pad, including the vertical alignment pins, may shift laterally relative to the locator holes. When the aircraft settles back down, the vertical alignment pins of the jack pad are out of alignment with the locator holes and therefore may advance into the fuselage or skin structure, causing damage to the aircraft structure.

Accordingly, it is desirable to provide a jack pad device for jacking an aircraft and a method for jacking an aircraft that addresses one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a jack pad device adapted to transfer loads between an aircraft and a jack device for jacking the aircraft, and various non-limiting embodiments of a method for jacking an aircraft, are provided herein.

In a first non-limiting embodiment, the jack pad device includes, but is not limited to, a jack pad body. The jack pad device further includes, but is not limited to, a jack engagement portion that extends from the jack pad body and that is configured to engage the jack device. The jack pad device further includes, but is not limited to, a first coupler that is attached to the jack pad body. The first coupler is configured to couple to the aircraft to hold the jack pad device to the aircraft.

In another non-limiting embodiment, the method includes, but is not limited to, the step of positioning a jack pad device adjacent to the aircraft. The jack pad device includes a jack pad body, a jack engagement portion that extends from the jack pad body, and a first coupler that is attached to the jack pad body. The method further includes, but is not limited to, the step of coupling the first coupler to the aircraft to hold the jack pad device to the aircraft. The method further includes, it is not limited to, the step of engaging the jack engagement portion with a jack device. The method further includes, but is not limited to, the step of moving the jack pad device with the jack device to jack the aircraft.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
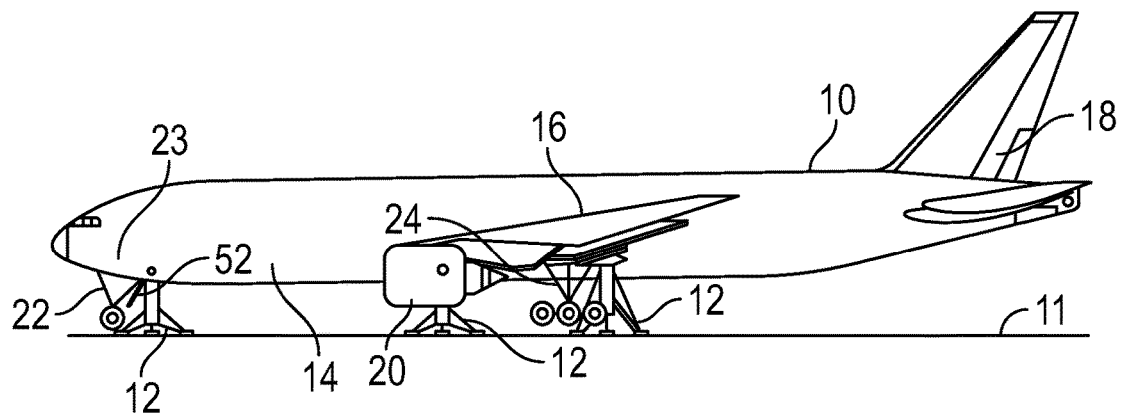
FIG. 1 illustrates a side view of an aircraft that has been jacked by a plurality of jack devices in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to jack pad devices adapted to transfer loads between an aircraft and a jack device for jacking the aircraft. As referred to herein, the term "jacking" is understood to mean moving an object (e.g., aircraft) in the substantially vertical direction, either upwardly or downwardly. The exemplary embodiments described herein provide a jack pad device that includes a jack pad body. A jack engagement portion extends from the jack pad body and is shaped, sized, and/or otherwise configured to engage a jack device. Attached to the jack pad body are one or more couplers that are configured to couple to the aircraft to hold the jack pad device to the aircraft.

In an exemplary embodiment, the jack pad device includes movable locator pins that are spaced apart from each other and that are each movably disposed in the jack pad body to move, for example vertically, between an extended position and a retracted position. In the extended positions, the distal end portions of the movable locator pins extend outside of the jack pad body, and in the retracted positions, the distal end portions are disposed inside the jack pad body.

In an exemplary embodiment, the jack pad device is positioned against or otherwise held against the aircraft such that the jack pad device is positioned at an intended location with respect to the aircraft, for example by advancing the movable locator pins in the extended positions into locator holes that are provided in the fuselage or skin structure of the aircraft. With the jack pad device against the aircraft, the one or more couplers are used to hold or otherwise couple the jack pad device at its intended location to the aircraft so that, for example, the movable locator pins remain in the locator holes without requiring the jack pad device to be manually held in position. The jack device is actuated to move the jack device's ram into engagement with the jack engagement portion of the jack pad device and to move the jack pad device vertically, thereby jacking the aircraft.

In an exemplary embodiment, it has been found that by supporting the jack pad device in position against the aircraft with the one or more couplers, a single technician can efficiently position a jack pad device at an intended location against the aircraft and then be free to move away from the jack pad device to actuate the jack device to move the jack device's ram into contact with the jack engagement portion. Further, it has been found that by supporting the jack pad device in position against the aircraft with the one or more couplers, if a certain section of the aircraft happens to get light or otherwise slightly lift when the aircraft is jacked up or is being jacked up, the jack pad does not shift relative to its intended location, thereby preventing any damage to the aircraft structure when the aircraft settles back down. Additionally, in an exemplary embodiment, even if the jack pad device did somehow shift relative to its intended location if a certain section of the aircraft happens to get light or otherwise slightly lift when the aircraft is jacked up or is being jacked up, when the aircraft settles back down, the movable locator pins, if misaligned with the locator holes, will contact the fuselage or skin structure and the distal end portions of the movable locator pins will be pushed downward by the aircraft from the extended positions to the retracted positions so that they no longer extend outside of the jack pad body, thereby preventing any damage to the aircraft structure.

FIG. 1 illustrates a side view of an aircraft 10 that has been jacked up and is being supported above the ground 11 by a plurality of jack devices 12 (e.g., tripod jacks or the like), in accordance with an exemplary embodiment. The aircraft 10 includes a fuselage 14 as the main body of the aircraft 10 that supports the wings 16 and tail 18. Depending on the design of the aircraft 10, the engines 20 may be attached to the wings 16, or alternatively, to the fuselage 14. As illustrated, the aircraft 10 includes landing gears 22 and 24 that are deployed in the extended positions. The landing gears 22 and 24 include a nose landing gear 22 disposed under a nose section 23 of the fuselage 14 and main landing gears 24 disposed under the wings 16 of the aircraft 10.

Figure 2:
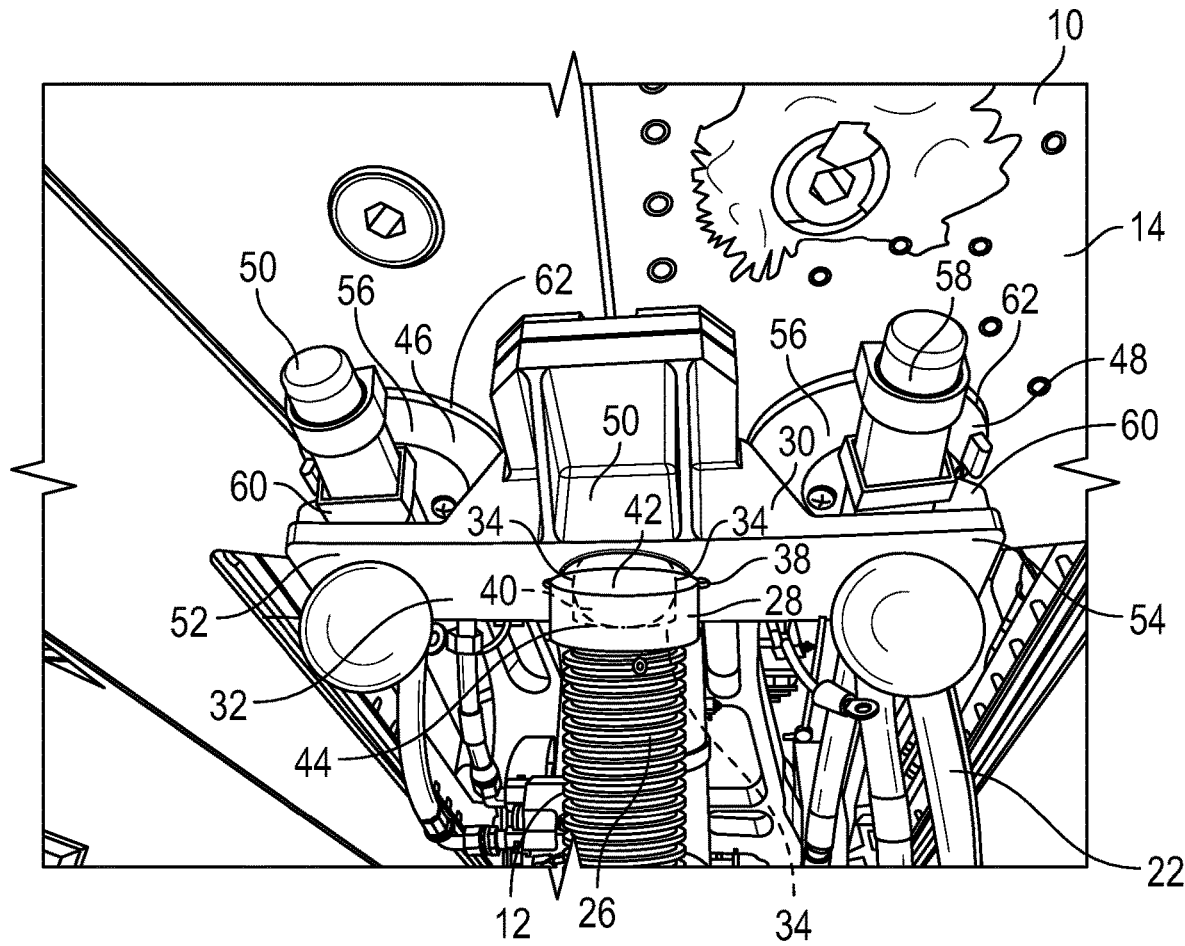
FIG. 2 illustrates a perspective lower rear view of a forward portion of an aircraft and includes a jack pad device and a portion of a jack device in accordance with an exemplary embodiment.

Referring also to FIG. 2, the jack devices 12 each include a ram 26 having a distal end sections 28 that is in contact with a jack pad device 30. As illustrated, the jack pad device 30 has a jack pad body 32 and a jack engagement portion 34 extending downwardly from the jack pad body 32. As will be discussed in further detail below, in an exemplary embodiment, the jack pad device 30 includes movable locator pins 36 and 38 (shown in FIGS. 3-8) extending upwardly into locator holes (not shown) provided in the fuselage 14 or skin structure of the aircraft 10. The distal end section 28 of the ram 26 is cooperatively configured with the jack engagement portion 34 such that the jack engagement portion 34 is received into engagement with the distal end section 28 of the ram 26 when the ram 26 is brought into contact with the jack pad device 30. In one example, the jack engagement portion 34 (see also FIGS. 3-7) includes a ball-like or semi-spherical feature 40 extending downwardly from a neck 42 that is coupled to the jack pad body 32 of the jack pad device 30 in which the semi-spherical feature 40 is received into an opening, socket, or pocket 44 formed in the distal end section 28 of the ram 26.

The jack pad device 30 includes couplers 46 and 48 that are attached to the jack pad body 32 and that couple to the aircraft 10 to hold the jack pad device 30 to the aircraft 10. In an exemplary embodiment, the couplers 46 and 48 hold the jack pad device 30 at its intended location against the outer surface of the fuselage 14 allowing limited or substantially no relative movement between the jack pad device 30 and the aircraft 10. At its intended location, the jack pad device 30 serves to transfer loads between the aircraft 10 and the jack device 12 for jacking the aircraft 10. In an exemplary embodiment, the jack pad body 32 and the jack engagement portion 34 are integrally formed (e.g., monolithic structure) of a relatively rigid material, such as a composite material or a metal material, such as aluminum or an aluminum alloy, or the like, to facilitate load transfer between the aircraft 10 and the jack device 12.

Figure 3:
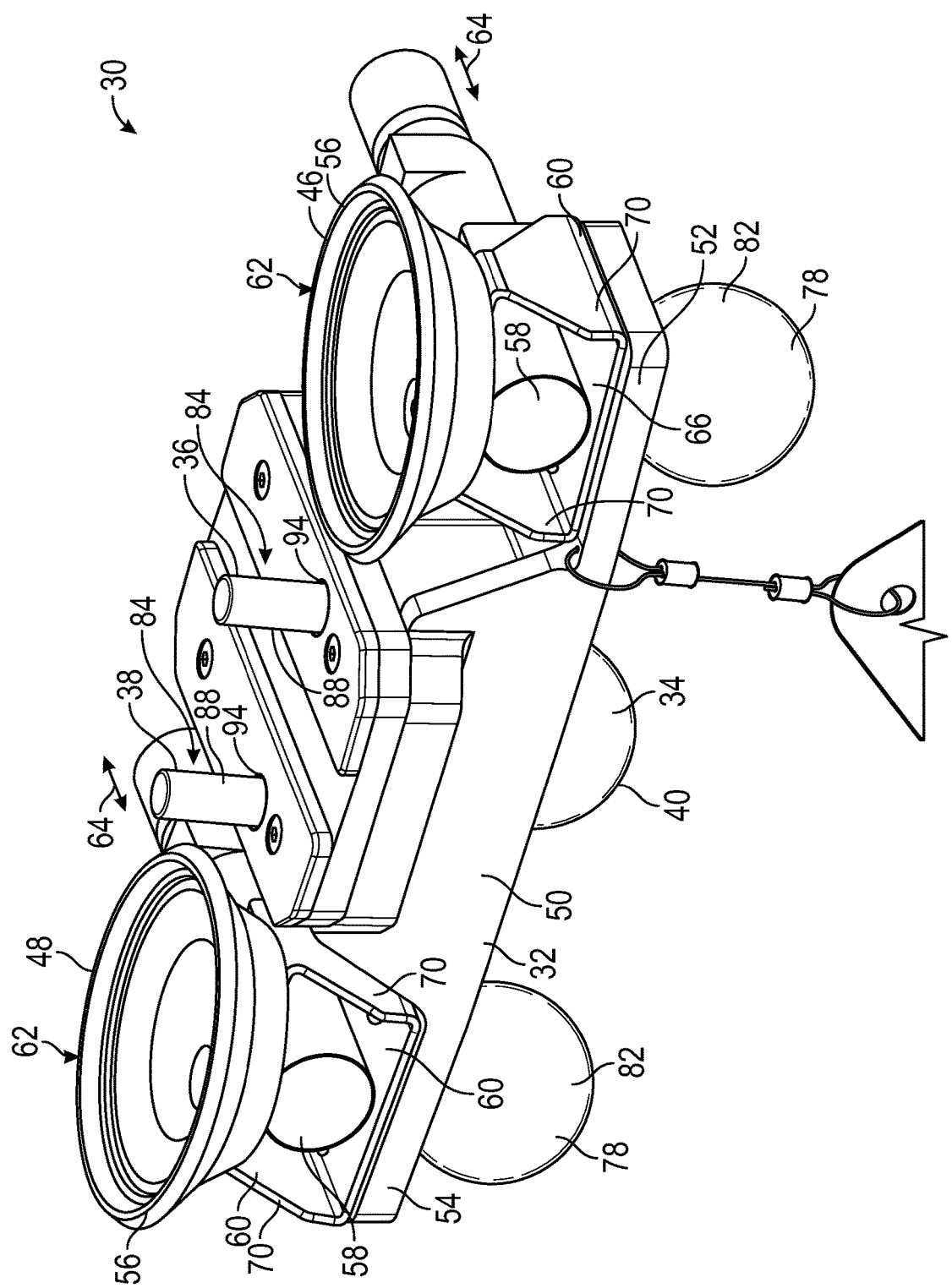
FIG. 3 illustrates a perspective side view of a jack pad device in accordance with an exemplary embodiment.
Figure 4:
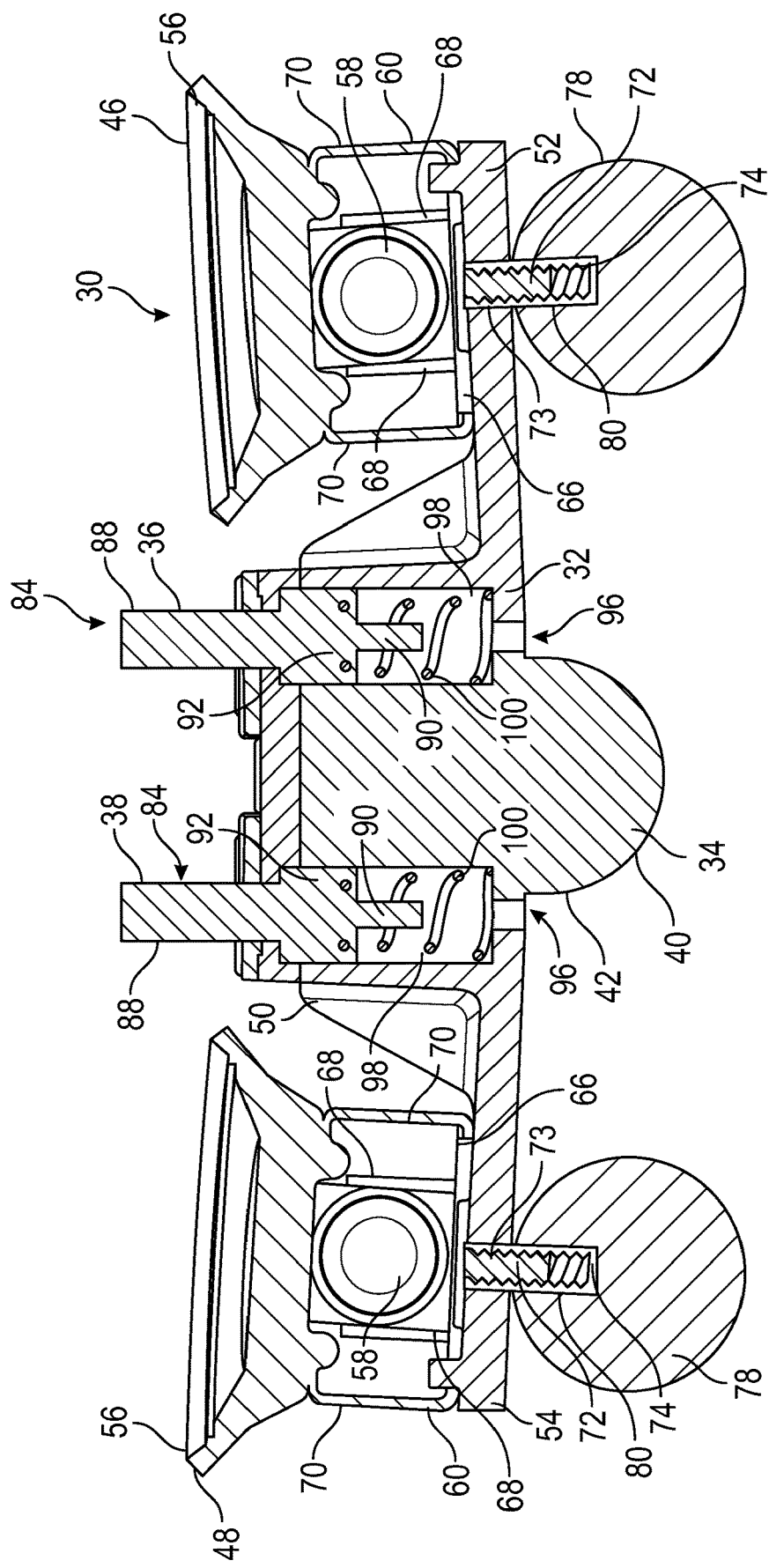
FIG. 4 illustrates a sectional view of a jack pad device in accordance with an exemplary embodiment.
Figure 5:
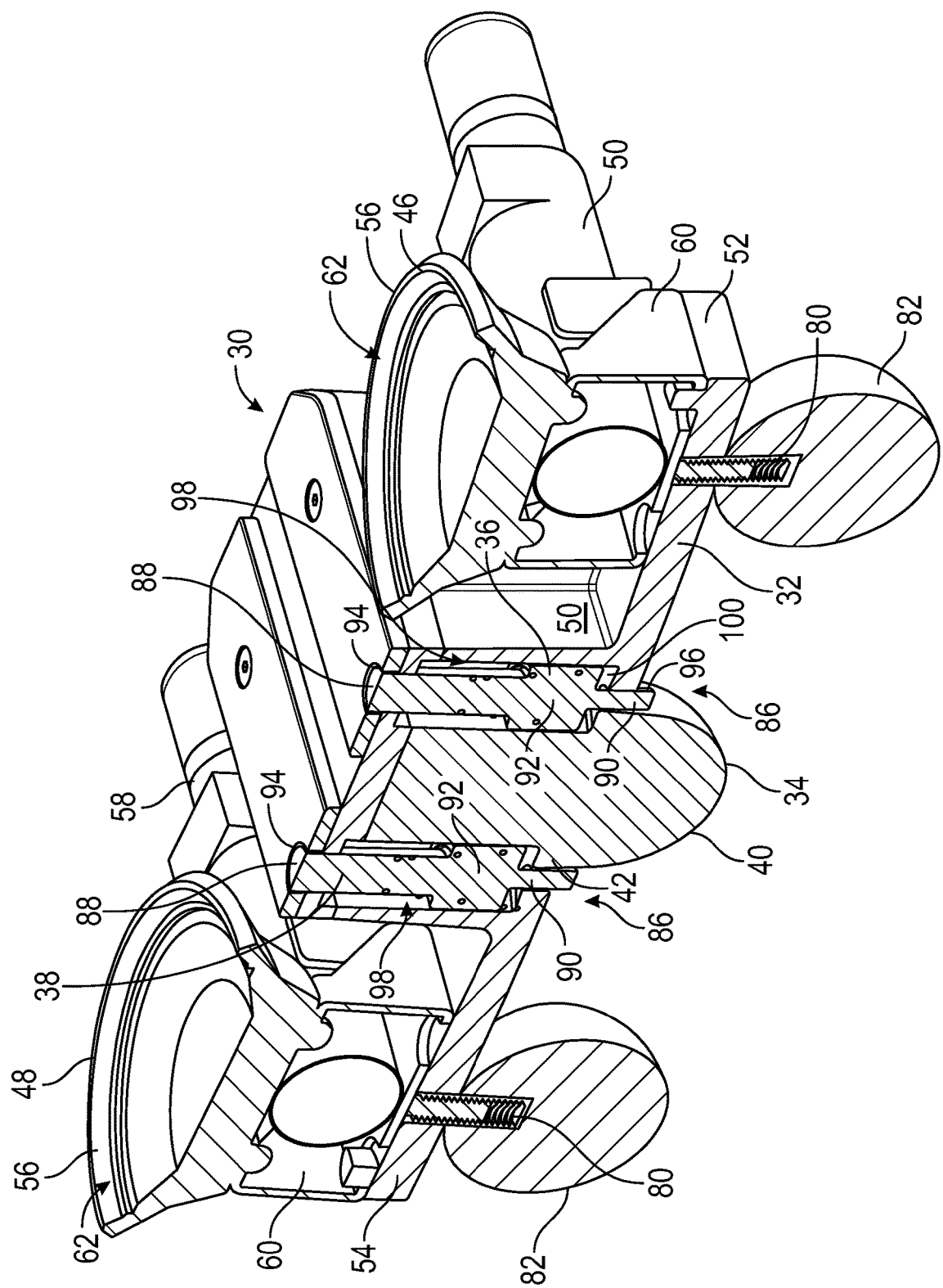
FIG. 5 illustrates a perspective sectional view of a jack pad device in accordance with an exemplary embodiment.
Figure 6:
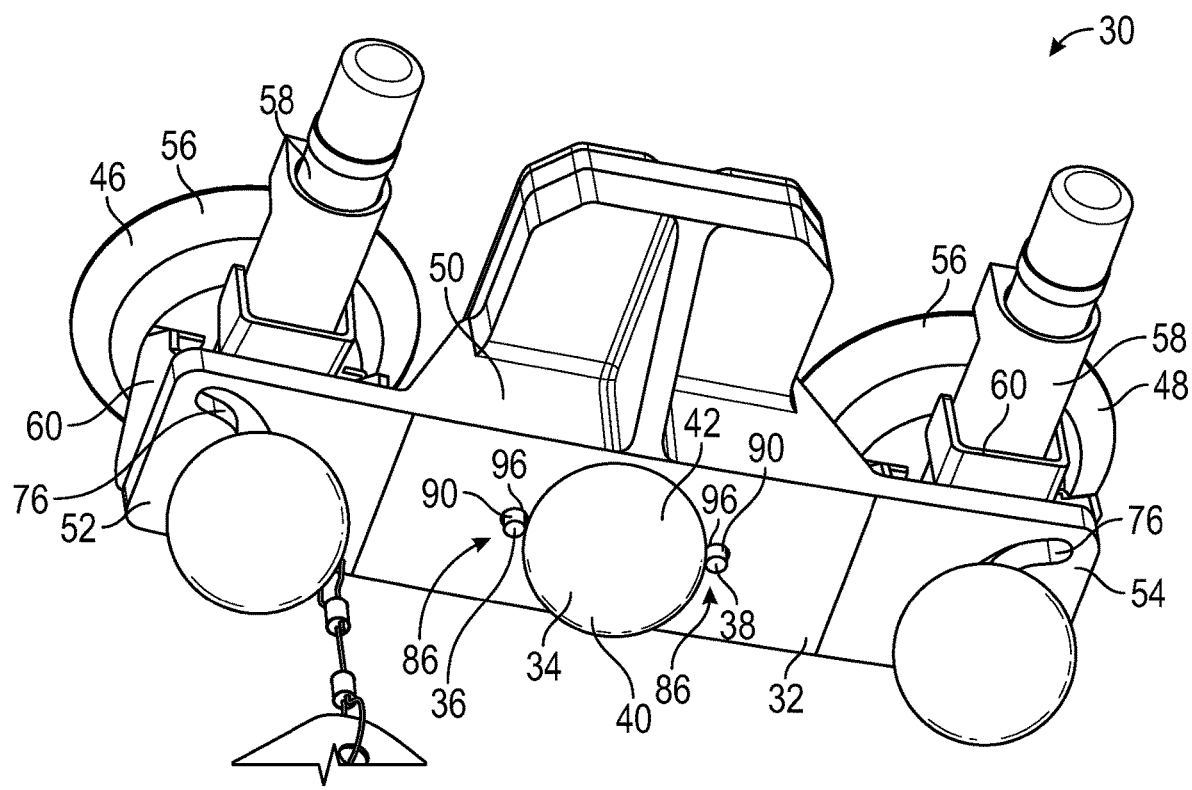
FIG. 6 illustrates a perspective bottom view of a jack pad device in accordance with an exemplary embodiment.
Figure 7:
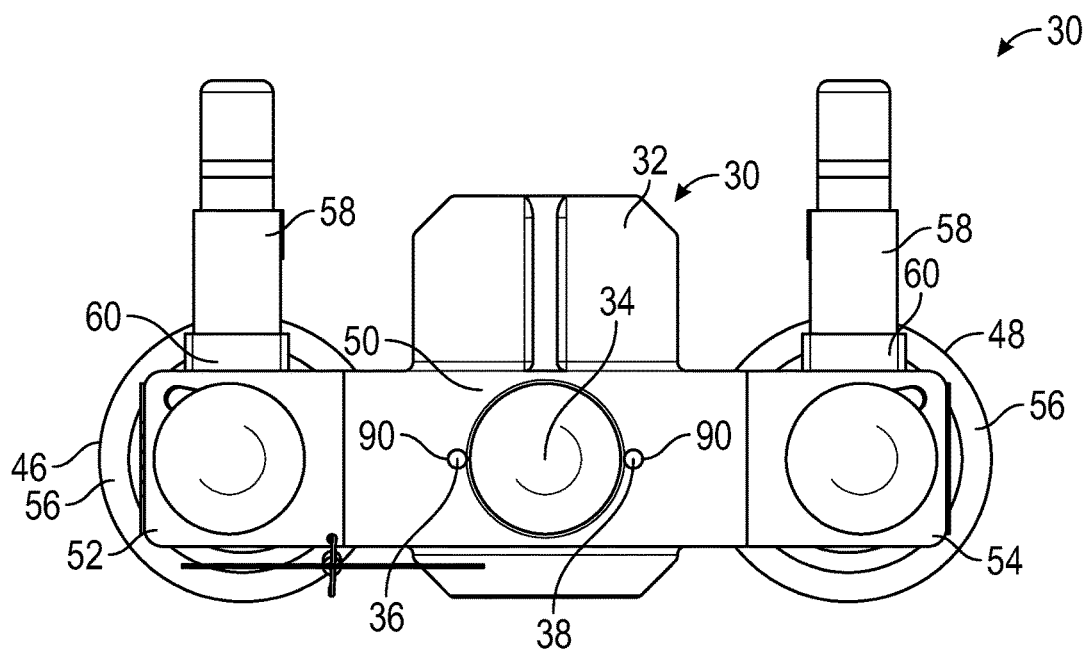
FIG. 7 illustrates a bottom view of a jack pad device in accordance with an exemplary embodiment.
Figure 8:
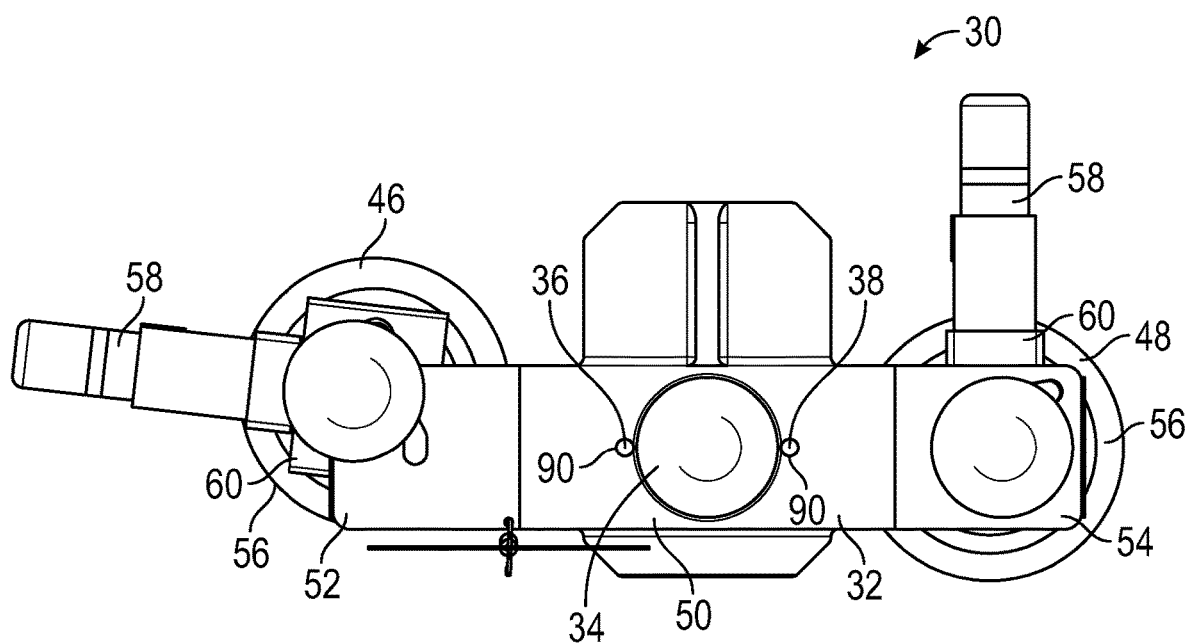
FIG. 8 illustrates a bottom view of a jack pad device in accordance with an exemplary embodiment.

Referring to FIGS. 2-3, in an exemplary embodiment, the jack pad body 32 has an intermediate body section 50 that includes the jack engagement portion 34, and arms or extension body sections 52 and 54 that are coupled to the intermediate body section 50 and that extend from opposite sides of the intermediate body section 50 in opposing directions. As illustrated, the coupler 46 is mounted on or otherwise attached to the upper side of the extension body section 52 and similarly, the coupler 48 is mounted on or otherwise attached to the upper side of the extension body section 54.

In an exemplary embodiment, each of the couplers 46 and 48 include a cup 56, a pump 58 that is in fluid communication with the cup 56, and a bracket 60 that attaches the corresponding cup 56 and pump 58 to their respective extension body section 52 or 54. As illustrated, the jack engagement portion 34 extends downwardly from the intermediate body section 50 towards the jack device 12 while the couplers 46 and 58 extend from the corresponding extension body sections 52 and 54 upwardly or in a direction towards the aircraft 10 such that the cup openings 62 (e.g., openings defined by the cup rims) of the cups 56 face the aircraft 10. In an exemplary embodiment, the cups 56 are relatively flexible, e.g., formed of an elastomeric, polymeric, a rubber material, and can be depressed against the outer skin of the aircraft 10 for removably coupling to the aircraft 10.

To help couple the cups 56 to the aircraft 10, the pumps 58 may be used to remove air from the cups 56 while the rims of the cups 56 are in contact or sealingly interface with the aircraft 10. In an exemplary embodiment, the pumps 58 are manually actuated pumps that can be independently actuated by a mechanic's hand or fingers using back and forth strokes (indicated by double headed arrow 64) to removed air from the cups 56 that are in contact with the aircraft 10, thereby creating a suction or vacuum condition between the cups 56 and the aircraft 10.

Referring to FIGS. 2-8 and as discussed above, the couplers 46 and 48 are attached to their respective extension body sections 52 and 54 by the brackets 60. As illustrated, each bracket 60 is configured as a support frame that includes a base wall 66 that is mounted on the corresponding top side or surface of the extension body section 52 or 54, and inner and outer sidewalls 68 and 70 that extend upwardly from the base wall 66. The inner sidewalls 68 couple the pump 58 to the base wall 66 while the outer sidewalls 70 couple the cup 56 to the base wall 66.

A threaded fastener 72 has a fastener end portion 73 coupled to the base wall 66 and extends downwardly therefrom through the corresponding extension body section 52 or 54 to a fastener end portion 74 to couple the bracket 60 to the extension body section 52 or 54. In an exemplary embodiment, the extension body sections 52 and 54 each have a slot 76 formed therethrough and the threaded fastener 72 extends through the slot 76 past the bottom side or surface of the extension body section 52 or 54, outside and adjacent to the jack engagement portion 34.

A handle 78 is disposed adjacent to the bottom side of each of the extension body sections 52 and 54 and has a threaded opening 80 with threads that engage the threads of the fastener end portion 74. In an exemplary embodiment, the handles 78 each have a substantially spherical handle body 82 that defines the threaded openings 80 and that is an ergonomically friendly shape that allows a mechanic to easily handle, manipulate, hold, and/or position the jacking pad device 30.

Referring to FIGS. 2 and 6-8, in an exemplary embodiment, the couplers 46 and 48 are movably attached to their corresponding extension body sections 52 and 54. As such, the positions of the couplers 46 and 48 can be independently adjusted to various positions along their corresponding extension body sections 52 and 54. Advantageously, in an exemplary embodiment, this allows a mechanic to adjust the position of one or both of the couplers 46 and 48, for example, to avoid a dent or surface defect that may be present on the outer skin surface of the fuselage 14 of the aircraft 10 proximate the intended location for positioning the jack pad device 30 so that the cups 56 can sealingly interface and couple to a smoother area(s) of the outer skin surface. As illustrated, the slots 76 are configured as curves slots that have concave shapes facing in outboard directions away from the intermediate body section 50. By turning one or both of the handles 78 in a direction (e.g., counterclockwise direction) to loosen the coupler(s) 46 and/or 48 from their corresponding extension body section(s) 52 and/or 54, the mechanic can simply move one or both of the handles 78 to advance the threaded fastener(s) 72 through the slot(s) 76 to move the cup 56 a desired position (shown for example in FIG. 8). Next, the mechanic can turn one or both of the handles 78 in an opposing direction (e.g., clockwise direction), to tighten the couplers 46 and 48 to their corresponding extension body section(s) 52 and/or 54 to fix the position of the cup(s) 56 to sealingly interface with the fuselage 14 of the aircraft 10.

Referring to FIGS. 2-6, as discussed above, the jack pad device 30 includes the movable locator pins 36 and 38 that are spaced apart from each other and that extend upwardly into locator holes (not shown) provided in the fuselage 14 or skin structure of the aircraft 10. The movable locator pins 36 and 38 are independently movably disposed in the jack pad body 32 to move between an extended position 84 (shown in FIGS. 3-4) and a retracted position 86 (shown in FIGS. 5-6).

The movable locator pins 36 or 38 each have a distal end portion 88, a proximal end portion 90 opposite the distal end portion 88, and an intermediate portion 92 disposed between the proximal end portion 90 and the distal end portion 88. When the movable locator pins 36 and 38 are in the extended positions 84, the distal end portions 88 extend upwardly past openings 94 and outside of the jack pad body 32 to engage the aircraft 10 while the proximal end portions 90 are disposed in chambers 98 formed in the jack pad body 32. When the movable locator pins 36 and 38 are in the retracted positions 86, the distal end portions 88 are disposed in the jack pad body 32, for example, in the openings 94 and partially into the chambers 98 while the proximal end portions 90 extend downward past openings 96 and outside of the jack pad body 32 adjacent to the jack engagement portion 34. Advantageously, by having the proximal end portions 90 extend outside of the jack pad body 32 adjacent to the jack pad engagement portion 34 when the movable locator pins 36 and 38 are in the retracted positions 86, the proximal end portions 90 are visible such that a mechanic can quickly ascertain whether or not the movable locator pins 36 and 38 are properly positioned in the locator holes of the aircraft 10.

In an exemplary embodiment, the movable locator pins 36 and 38 are biased in the extended positions 84 but retract when acted upon by a downward force, e.g., being pushed against the outer skin of the fuselage 14, to the retracted positions 86. As illustrated, biasing elements 100 (e.g., coil springs, leaf springs, elastomeric bushings, or the like) are disposed in the chambers 98 and are correspondingly coupled to the intermediate portions 92 of the movable locator pins 36 and 38. The biasing elements 100 provide a spring force that biases the movable locator pins 36 and 38 in the extended positions 84 but allow the movable locator pins 36 and 38 to retracted when acted upon by a downward force.

Figure 9:
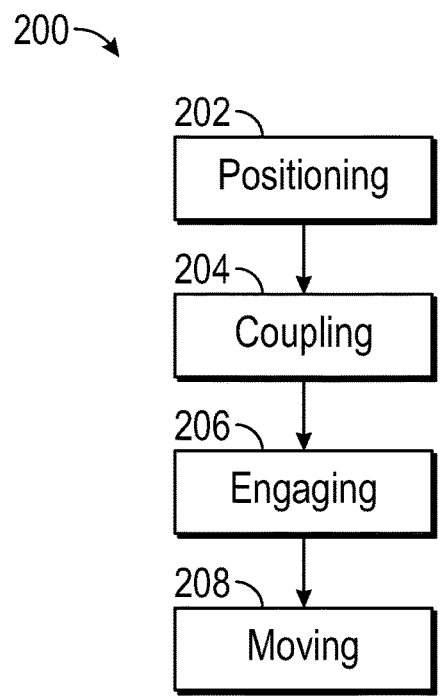
FIG. 9 illustrates a method for jacking an aircraft in accordance with an exemplary embodiment.

Referring to FIG. 9, a method 200 for jacking an aircraft is provided. The method 200 includes positioning (STEP 202) a jack pad device adjacent to the aircraft. The jack pad device includes a jack pad body, a jack engagement portion that extends from the jack pad body, and a coupler that is attached to the jack pad body.

The coupler is coupled (STEP 204) to the aircraft to hold the jack pad device to the aircraft. The jack engagement portion is engaged (STEP 206) with a jack device. The jack pad device is moved (STEP 208) with the jack device to jack the aircraft.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A jack pad device adapted to transfer loads between an aircraft and a jack device for jacking the aircraft, the jack pad device comprising:
a jack pad body;
a first movable locator pin and a second movable locator pin that are each movably disposed in the jack pad body to move between an extended position and a retracted position, wherein the first movable locator pin and the second movable locator pin that are spaced apart from each other, wherein the first movable locator pin has a first distal end portion and the second movable locator pin has a second distal end portion, and wherein when the first and second locator pins are in the extended positions, the first and second distal end portions extend outside of the jack pad body on a side opposite jack the jack engagement portion to engage the aircraft, wherein the first movable locator pin has a first proximal end portion opposite the first distal end portion and the second movable locator pin has a second proximal end portion opposite the second distal end portion, and wherein when the first and second locator pins are in the retracted positions, the first and second proximal end portions extend outside of the jack pad body adjacent to the jack engagement portion, wherein the first movable locator pin has a first intermediate portion that is disposed between the first proximal end portion and the first distal end portion and that is disposed in the jack pad body, wherein the second movable locator pin has a second intermediate portion that is disposed between the second proximal end portion and the second distal end portion and that is disposed in the jack pad body;
a jack engagement portion extending from the jack pad body and configured to engage the jack device; and
a first coupler attached to the jack pad body and configured to couple to the aircraft to hold the jack pad device to the aircraft, and wherein the jack pad device further comprises:
a first biasing element disposed in the jack pad body and coupled to the first intermediate portion; and
a second biasing element disposed in the jack pad body and coupled to the second intermediate portion, wherein the first biasing element and the second biasing element bias the first and second movable locator pins, respectively, in the extended positions.

2. The jack pad device of claim 1, wherein when the first and second locator pins are in the retracted positions, the first and second distal end portions are disposed in the jack pad body.

3. The jack pad device of claim 1, wherein when the first and second locator pins are in the extended positions, the first and second proximal end portions are disposed substantially in the jack pad body.

4. The jack pad device of claim 1, wherein the first movable locator pin and the second movable locator pin are configured to move independently from each other between the extended positions and the retracted positions.

5. The jack pad device of claim 1, wherein the jack engagement portion extends from the jack pad body in a first direction, and wherein the first coupler comprises a first cup configured for coupling to the aircraft and that has a first cup opening facing in a second direction opposite the first direction.

6. The jack pad device of claim 5, wherein the first coupler further comprises a first pump in fluid communication with the first cup to facilitate removing air from the first cup when the first cup is in contact with the aircraft.

7. The jack pad device of claim 6, wherein the first pump is a manually actuated pump.

8. The jack pad device of claim 6, wherein the first coupler further comprises a first bracket that attaches the first cup and the first pump to the jack pad body.

9. The jack pad device of claim 8, wherein the first coupler further comprises a first threaded fastener that attaches the first bracket to the jack pad body.

10. The jack pad device of claim 9, wherein the first threaded fastener has a first fastener end portion coupled to the first bracket and a second fastener end portion opposite the first fastener end portion, and wherein the first bracket and the first fastener end portion are disposed adjacent to a first side of the jack pad body opposite the jack engagement portion, and the first threaded fastener extends from the first fastener end portion through the jack pad body to the second fastener end portion that is disposed outside of the jack pad body on a second side of the jack pad body that is adjacent to the jack engagement portion, and wherein the jack pad device further comprises a handle that is coupled to the second fastener end portion adjacent to the jack engagement portion.

11. The jack pad device of claim 10, wherein the handle includes a spherical handle body.

12. The jack pad device of claim 5, wherein the jack pad body has an intermediate body section that includes the jack engagement portion, a first extension body section and a second extension body section that are coupled to the intermediate body section and extend therefrom in opposing directions, wherein the first coupler is coupled to the first extension body section, and wherein the jack pad device further comprises a second coupler that is coupled to the second extension body section and that is configured to couple to the aircraft.

13. The jack pad device of claim 1, wherein the first coupler is moveably attached to the jack pad body such that the first coupler is adjustable to various positions relative to the jack pad body.

14. A method for jacking an aircraft, the method comprising the steps of:
positioning a jack pad device adjacent to the aircraft, wherein the jack pad device comprises a jack pad body, a first movable locator pin and a second movable locator pin that are each movably disposed in the jack pad body to move between an extended position and a retracted position, a jack engagement portion that extends from the jack pad body, and a first coupler that is attached to the jack pad body, wherein the first movable locator pin and the second movable locator pin are spaced apart from each other, and wherein positioning the jack pad device comprises positioning the first and second movable locator pins in the extended positions correspondingly into locator holes in a skin structure of the aircraft;
coupling the first coupler to the aircraft to hold the jack pad device to the aircraft;
engaging the jack engagement portion with a jack device; and
moving the jack pad device with the jack device to jack the aircraft.

15. A method for jacking an aircraft, the method comprising the steps of:

positioning a jack pad device adjacent to the aircraft, wherein the jack pad device comprises a jack pad body, a jack engagement portion that extends from the jack pad body, and a first coupler that is attached to the jack pad body;

coupling the first coupler to the aircraft to hold the jack pad device to the aircraft;

engaging the jack engagement portion with a jack device; and moving the jack pad device with the jack device to jack the aircraft, wherein the first coupler comprises a first cup and a first pump in fluid communication with the first cup, and wherein coupling the first coupler comprises pumping the first pump to remove air from the first cup to couple the first cup to the aircraft.

16. The method of claim 15, wherein pumping the first pump comprises manually actuating the first pump.

* * * * *